United States Patent [19]

Hirota et al.

[11] Patent Number: 4,599,282
[45] Date of Patent: Jul. 8, 1986

[54] FUEL CELL

[75] Inventors: Toshio Hirota; Hiroyuki Tajima; Tomohiro Sugiyama, all of Kanagawa, Japan

[73] Assignee: Fuji Electric Company Ltd., Kawasaki, Japan

[21] Appl. No.: 689,979

[22] Filed: Jan. 9, 1985

[30] Foreign Application Priority Data

Sep. 19, 1984 [JP] Japan .................. 59-141909[U]

[51] Int. Cl.$^4$ ............................................. H01M 8/04
[52] U.S. Cl. ....................................... 429/26; 429/34; 429/120
[58] Field of Search ................... 429/26, 120, 34

[56] References Cited

U.S. PATENT DOCUMENTS

| | | | |
|---|---|---|---|
| 4,416,955 | 11/1983 | Chi | 429/26 |
| 4,478,918 | 10/1984 | Ueno et al. | 429/26 X |
| 4,489,142 | 12/1984 | Chi et al. | 429/26 |
| 4,500,612 | 2/1985 | Fujii et al. | 429/26 |
| 4,508,793 | 4/1985 | Kumata et al. | 429/26 |

*Primary Examiner*—Charles F. LeFevour
*Attorney, Agent, or Firm*—Finnegan, Henderson, Farabow, Garrett & Dunner

[57] ABSTRACT

The present invention relates to a fuel cell having separate plates acting as bipolar plates which are sandwiched between the two adjacent cell elements. A cell stack of a fuel cell is formed therein with tunnel-shaped cooling gas passages extending between and open at two opposite sides thereof. Reactive gas supply passages for fuel gases and air are isolated from the cooling gas passages and extend between and open at the two opposite sides thereof which are different from those of the cooling gas passages. Therefore, the separate plates have their reactive gas supply passages supplied through manifolds, which are arranged at the sides of the fuel cell in a manner to face the entrance and exit ports of the reactive gas supply passages. The reactive gases are supplied at rates sufficient to be consumed by the galvanic reaction. The cooling gas passages are supplied through manifolds, which are arranged at the other sides of the fuel cell, i.e. different from the sides of the reactive gas supply passages. The cooling gases take no part in the galvanic reaction at a proper flow rate, whereby the respective cell elements constructing the cell stack of the fuel cell is cooled uniformly without establishing a temperature difference between the cell elements.

8 Claims, 6 Drawing Figures

COOLING AIR

REACTIVE GAS

FUEL CELL

BACKGROUND OF THE INVENTION

The present invention relates to a matrix type fuel cell using an electrolyte such as phosphoric acid and, more particularly, to a structure for a fuel cell in which a number of cell elements are stacked through ribbed separate plates called bipolar plates and each formed in both its upper and lower faces with grooves defining reactive gas supply passages for supplying reactive gases such as fuel gases and air to the anode and cathode of the corresponding one of the cell elements.

First of all, the structure of the above-specified fuel cell according to the prior art will be explained with reference to FIG. 1. Indicated at reference numeral 1 in FIG. 1 is a cell element which is constructed by sandwiching between an anode and a cathode a matrix layer impregnated with an electrolyte. The cell elements 1 and separate plates indicated at numeral 2 are alternately stacked to construct a fuel cell stack. Here, each of the separate plates 2 is made of a gas-impermeable carbon plate and is formed in its upper and lower faces with numerous grooves of two groups which extend at a right angle to define reactive gas supply passages 3 and 4 for supplying fuel gases and air, respectively. In the fuel cell thus constructed, the fuel gases and the air are supplied in the directions of arrows from the outside through not-shown manifolds to the reactive gas supply passages 3 and 4 of the separate plates 2, from which the reactive gases are further supplied to the respective electrodes of the sandwiched cell element 1 so that a galvanic reaction is caused to produce electricity, as is well known in the art.

Incidentally, in order to have an efficient run of the fuel cell using the aforementioned phosphoric acid as an electrolyte, the fuel cell is run while having its temperature maintained usually at about 190° C. While a heat of reaction corresponding to the energy of the produced electricity is generated by the galvanic reaction, the fuel cell has to be cooled so that it may be maintained at the above-specified running temperature. In the cooling method of this case, generally speaking, water, gases, oil and so on are used as a coolant. One of the most generally adopted method is conducted by supplying the air at a higher flow rate than that required for the galvanic reaction to the air supply passage of the separate plates 1 and by allowing the air to be partially consumed by the galvanic reaction while carrying the generated heat of the cell by the flow of the excess air.

Generally, the electrolyte such as the phosphoric acid held in the matrix layer of the cell element evaporates and scatters out and is carried to the outside of the cell by the flow of the reactive gases so that the content in the matrix layer is gradually decreased. The loss of the electrolyte in this case increases in proportion to the flow rate of the reactive gases. As a result, the method of cooling the fuel cell by excessively supplying the air or the reactive gas, as has been described above, cause a high rate of the electrolyte to be scattered and lost. Thus, the fuel cell is hard to run efficiently and safely for a long time. This makes necessary the troublesome running operation such as frequent supplies of the electrolyte in the course of the run. The method of using water as the cooling medium has a complicated structure of a cooling system including a water piping line because it is necessary to prevent the cell from being short-circuited by the cooling medium and the water piping line from interfering with the manifolds of the reactive gas supply systems.

According to one method, there has been adopted a structure in which a cooling plate is arranged for every several cell elements and cooling water pipes are piped through the cooling plate. In this method, the cooling effect is high for the cell elements adjacent to the cooling plates but is low for the remaining cell elements spaced from the cooling plates. This establishes a difference in the temperature distribution between the cell elements constructing the cell stack, so that a proper cell cooling effect cannot be achieved.

There is also known a method in which air is used in place of the water as the cooling medium and in which cooling air passages are opened in cooling plates fitted for every several cell elements in the cell stack of the fuel cell for supplying the air through common manifolds together with the aforementioned reactive gas or air so that a portion of the air is supplied as the reactive gas to the electrodes of the cell elements whereas the remaining portion is guided to flow through the air passages of the cooling plates to strengthen the cooling effect of the cell, as is disclosed in Japanese Patent Laid-Open No. 154181/1983. However, this method is also accompanied like the aforementioned cooling water method by the temperature distribution difference between the cell elements constructing the cell stack. Since the reactive gas supply passages and the cooling air passages are opened in the common manifolds, it is difficult to dispense and adjust the air flow rates inbetween. If the flow rate of the air to be introduced into the manifolds is increased so as to increase the draft of the cooling air, the air supply rate to the reactive gas supply passage is necessarily increased at the same time. This creates an excess supply of air, which is more than that required for the galvanic reaction. Hence, the scatter and loss of the electrolyte is increased.

SUMMARY OF THE INVENTION

In view of the background thus far described, therefore, it is an object of the present invention to provide a fuel cell, especially a structure for the separate plate of the fuel cell which is constructed such that each of separate plates forming a part of the fuel cell is supplied through its reactive gas supply passages with reactive gases at a rate sufficient for the galvanic reaction and with a cooling medium such as air separately and independently of the reactive gases to ensure a cooling effect.

In order to achieve the above-specified object, according to the present invention, each of separate plates acting as bipolar plates are sandwiched between two adjacent cell elements. A cell stack of a fuel cell is formed therein with tunnel-shaped cooling medium passages extending between and open at two opposite sides thereof. Reactive gas supply passages for fuel gases and are isolated from the cooling medium passages and extend between and open at the two opposite sides thereof which are different from those of said cooling medium passages. Therefore, the separate plates have their reactive gas supply passages supplied through manifolds, which are arranged at the sides of the fuel cell in a manner to face the entrance and exit ports of the reactive gas supply passages. The reactive gases are supplied at rates sufficient for those to be consumed by the galvanic reaction. The cooling medium passages are supplied through manifolds, which are arranged at the other sides of the fuel cell, i.e. different from the sides of the reactive gas supply passages. The cooling medium or air takes no part in the galvanic reaction at a proper flow rate, whereby the respective cell elements constructing the cell stack of the fuel cell is cooled uniformly without establishing a temperature difference between the cell elements.

According to a major feature of the present invention, there is provided a fuel cell comprising: a plurality of cell elements each having an anode, a cathode and a matrix layer sandwiched between said anode and said cathode and holding an electrolyte therein; and a plurality of square-shaped separate plates stacked one over another such that any adjacent two thereof sandwich each of said cell elements inbetween, each of said separate plates being formed in the upper and lower faces with grooves defining reactive gas supply passages for supplying reactive gases such that the reactive gas supply passages, which are defined by said grooves formed in the faces of two adjacent separate plates, supply the reactive gases to said anode and said cathode of that one of said cell elements, respectively, which is sandwiched between said adjacent two of said separate plates, wherein the improvement resides: in that each of said separate plates is formed therein with a plurality of tunnel-shaped cooling medium passages extending between the opposed two sides thereof for supplying a cooling medium; and in that said reactive gas supply passages defined by said grooves formed in the upper and lower faces of said each of said separate plates are isolated from said cooling medium passages and opened in the opposed two sides of the same other than the two of said cooling medium passages for supplying a fuel and air, respectively.

DESCRIPTION OF THE PREFERRED EMBODIMENTS

Figure 1:
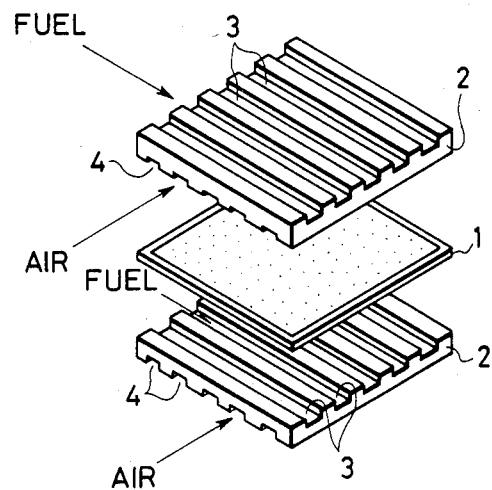
FIG. 1 is an exploded perspective view showing the construction of one cell element of the fuel cell according the prior art.
Figure 2:
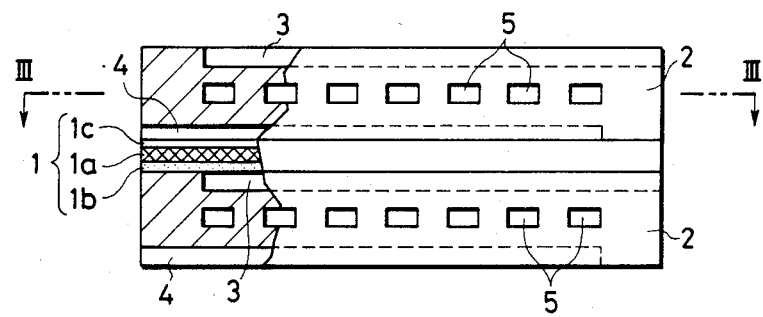
FIG. 2 is a partially sectional side elevation showing the construction of one cell element of a fuel cell according to an embodiment of the present invention.
Figure 3:
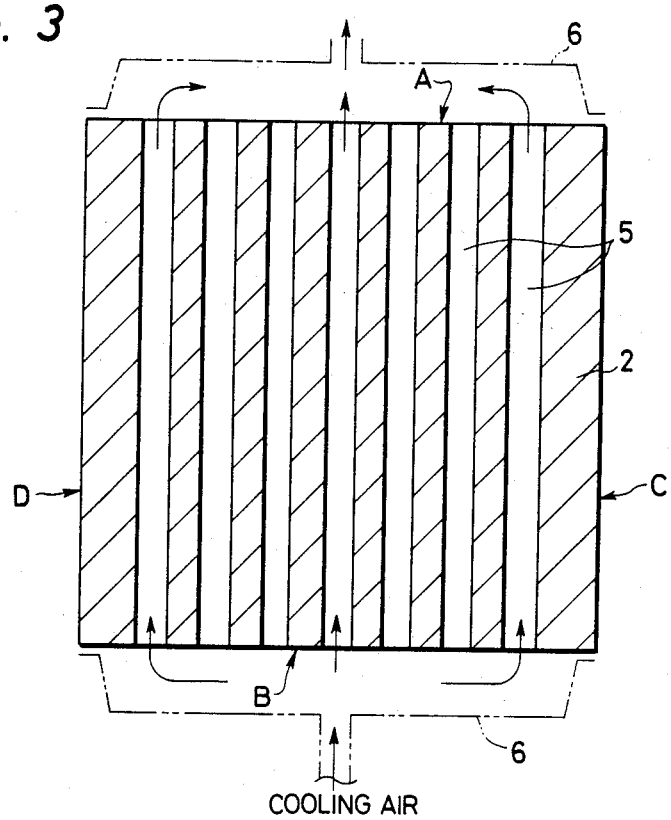
FIG. 3 is a section taken along line III—III of FIG. 2.

The same reference numerals appearing in FIGS. 2 to 6 as those of FIG. 1 indicate identical or corresponding parts and portions.

First of all, in the first embodiment shown in FIGS. 2 to 5, a cell element 1 is constructed of a matrix layer 1a, and an anode 1b and a cathode 1c sandwiching the matrix layer 1a inbetween. The cell elements 1 thus constructed are laminated or stacked on ribbed separate plates 2. Here, each of these squareshaped separate plates 2 is formed therein with a tunnel-shaped cooling medium passages 5 which are arrayed in a plurality of parallel rows extending between and opened in two opposed sides A and B so that forced draft of air acting as a cooling medium is effected from an external cooling air blower through manifolds 6 indicated by dotted lines (as better seen from FIG. 3).

Figure 4:
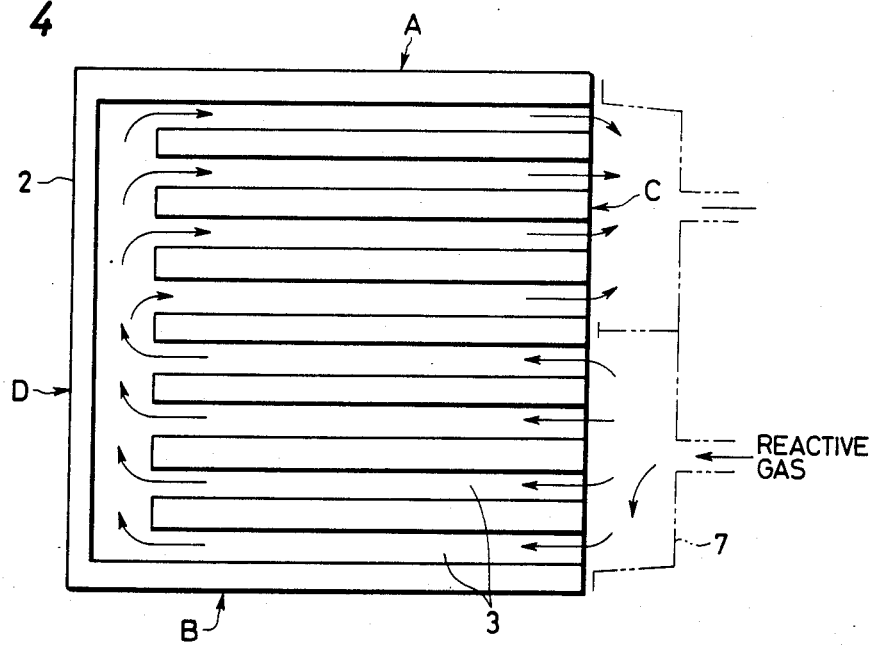
FIGS. 4 and 5 are top and bottom plan views showing the upper and lower faces of a separate plate of FIG. 2.
Figure 5:
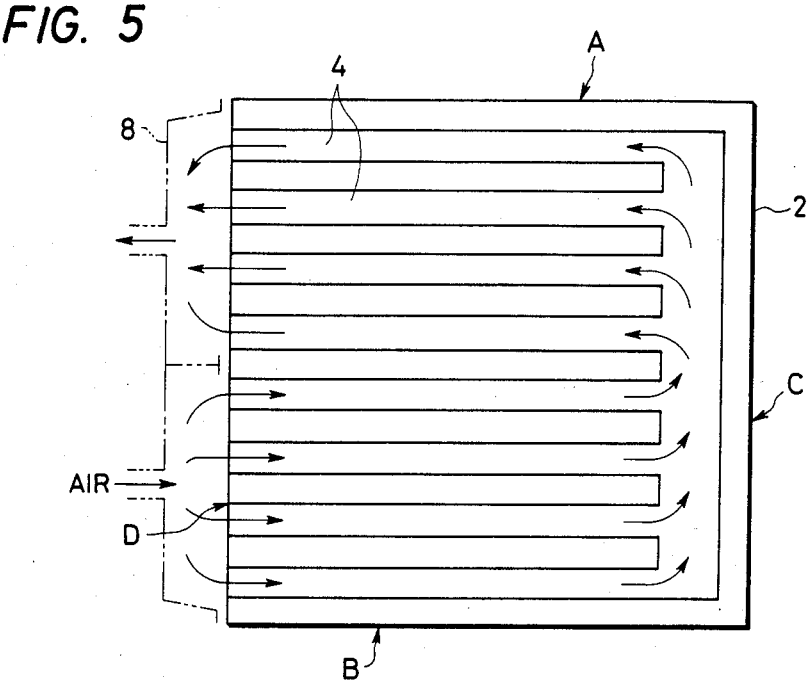

On the other hand, the separate plate 2 is formed in both its upper and lower faces with reactive gas supply passages 3, which face the anode 1b of the corresponding cell element 1 for supplying fuel gases, and reactive gas supply passages 4 which face the cathode 1c of the corresponding cell element 1 for supplying the air. Here, the respective reactive gas supply passages 3 and 4 are defined by two groups of grooves extending in the upper and lower faces of the separate plate 2, respectively, and have their supply and discharge ports opened in the other two sides C and D which intersect at a right angle with the sides A and B of the aforementioned cooling medium passages 5. In this embodiment, moreover, the fuel supply passages 3 and the air supply passages 4 are formed in the shape of letter "U" by collecting the reactive gas supply and discharge ports so that both the fuel supply and discharge ports are opened in the common side C (as shown in FIG. 4) whereas both the air supply and discharge ports are opened in the common side D, opposite side C (as shown in FIG. 5). Thus, the reactive gases of the fuel gases and the air are supplied from the outside through manifolds 7 and 8, as indicated by dotted lines, which are arranged at the sides of the fuel cell in a manner to correspond to the respective reactive gas supply passages 3 and 4.

With the construction thus far described, when the fuel cell is run, the reactive gases of the fuel gases and the air are dispensed and supplied through the reactive gas supply passages 3 and 4, respectively, to all the cell elements 1 constructing the cell stack of the fuel cell. The air acting as the cooling medium is directed uniformly through the cooling medium passages 5 to the respective separate plates 2. Here, the flow rates of the reactive gases to be supplied are so controlled as to mate the galvanic reaction for generating electricity but are not excessive, as is different from the cooling system of the prior art. On the contrary, the flow rate of the air to be directed to the cooling medium passages 5 is set independently of the supply rate of the aforementioned reactive gas or the air and is controlled at a value sufficient to maintain the running temperature of the cell at a proper level in accordance with the heat generated in the cell. As a result, the fuel cell conducts a predetermined galvanic reaction while its heat of reaction is carried by the air flowing through the cooling medium passages.

Further, the reactive gases are supplied at a proper flow rate, and the air flowing through the cooling medium passages 5 does not participate in the galvanic reaction. As a result, the scatter and loss of the electrolyte held in the matrix layer are minimized so that the run of the fuel cell can be continued efficiently and safely for a long time without any supply of the electrolyte. At the same time, the cooling air is dispensed uniformly to carry the heat from all the separate plates 2 constructing the cell stack so that the running temperature of the cell can be maintained at a proper level without any temperature difference between the cell elements. In this case, moreover, the reactive air supply passages 4 and the cooling air passages 5 are opened in the different sides of each of the separate plates 2 so that their air supply rates can be controlled at proper levels through their respective manifolds 6 and 8 by means of flow control valves or the like.

In the embodiment shown in FIGS. 2-5, incidentally, the supply and discharge ports of the reactive gas supply passages 3 and 4 are opened in the different sides of each of the separate plates 2. Despite this fact, however, the present invention can also be likewise practised and applied to the fuel cell which is so constructed that the supply and discharge of the fuel gases and the air by the reactive gas supply passages 3 and 4 are opened at the same side of the corresponding separate plate 2.

Figure 6:
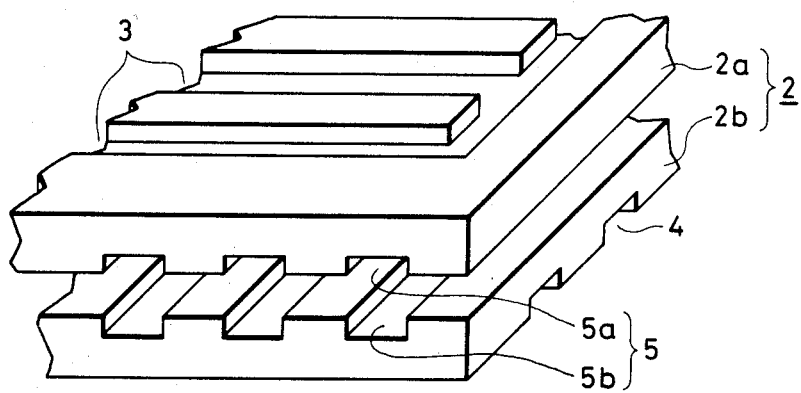
FIG. 6 is an exploded perspective view showing a portion of the construction of a separate plate according to another embodiment of the present invention.

Another embodiment of the present invention will be described in the following with reference to FIG. 6. In the second embodiment shown in FIG. 6, each separate plate 2 is a joint structure having upper and lower plate halves 2a and 2b overlaid the former on the latter. Of these plate halves, the upper one 2a is formed in its upper face with reactive gas supply passages 3 for supplying the fuel gases like those of FIG. 3 whereas the lower one 2b is formed in its lower face with reactive gas supply passages 4 for supplying the air like those of FIG. 4. At the same time, the two split plate halves 2a and 2b are formed in their joint faces with grooves 5a and 5b for defining the tunnel-shaped cooling medium passages 5 like those of the foregoing embodiment when the two plate halves 2a and 2b are connected. Specifically, the respective plate halves 2a and 2b are jointed to each other into an integral structure by means of a conductive adhesive after they have been formed separately of each other with the reactive gas supply passages 3 and the grooves 5a of the cooling medium passages 5 and with the reactive gas supply passages 4 and the grooves 5b, respectively, by a cutting method or a molding method.

According to this second embodiment, the work for forming the cooling medium passages 5 can be more simplified and facilitated than that of the foregoing first embodiment. Incidentally, the upper and lower plate halves of the separate plate 2 are sufficient, if they extend through and in parallel with the cooling medium passages 5, but their split faces need not always extend through the center lines of the cooling medium passages 5. Therefore, these cooling medium passages 5 can be defined by grooves which are formed in only one of the upper and lower plate halves.

In accordance with the present invention, each of the separate plates is formed therein with both the tunnel-shaped cooling medium passages, which extend between and are opened in the opposed two sides of the corresponding separate plate for supplying the cooling medium such as the air, and the reactive gas supply passages which are isolated from the cooling medium passages and which extend between and are opened in the two sides other than the sides of said cooling medium passages for supplying the fuel gases and the air. The cooling medium or gas can be directed easily and uniformly to all the separate plates, that are sandwiched between the cell elements constructing the cell stack of the fuel cell, with neither interference with the reactive gases nor participation into the galvanic reaction. As a result, it is possible to ensure such an effective cooling as to have a substantially uniform temperature distribution between the cell elements while suppressing the scatter and loss of the electrolyte held in the matrix layer.

What is claimed is:
1. A fuel cell for receiving reactive air and fuel comprising:
   at least one fuel cell element having an anode, a cathode and a matrix layer interposed therebetween, said matrix layer supporting an electroylyte, the reactive air and fuel producing reacted gased upon communication with the said fuel cell elements;
   at least two substantially rectangular plate members spaced essentially in parallel and having at least one fuel cell element positioned between and in contact with each of said at least two plate members, allowing said at least one fuel cell element to contact adjacent ones of said at least two plate members, said contacting surfaces of each of said adjacent ones of said at least two plate members having four edges;
   groove means extending along a first one of said contacting surfaces of said at least two plate members for supplying the reactive fuel to said cell elements, said groove means having a first entry manifold to deliver the reactive fuel to said groove means and a first exit manifold to receive reacted gases, wherein said first entry and exit manifolds are aligned along the same edge of said first one of said contacting surfaces;
   channel means extending along a remaining one of said contacting surfaces of said at least two plate members for supplying reactive air to said fuel cell elements, said channel means having a second entry manifold to deliver the reactive air to said channel means and a second exit manifold to receive reacted gases, wherein said second entry and exit manifolds are aligned along the same edge of said second one of said contacting surfaces; and
   tunnel passages extending within and across the length of each of said at least two plate members, wherein said tunnel passages transfer cooling gases within each of said at least two plate members and wherein said tunnel passages extend substantially perpendicular to said groove means and said channel means.

2. The fuel cell as defined in claim 1, wherein said first entry and exit manifolds and said second entry and exit manifolds are positioned on similar sides of said at least two plate members.

3. The fuel cell as defined in claim 1, wherein said first entry and exit manifolds and said second entry and exit manifolds are positioned on opposite sides of said at least two plate members.

4. The fuel cell as defined in claim 1, wherein said cooling gases comprise air.

5. A fuel cell for receiving reactive fuel and air comprising:
   at least one fuel cell element having an anode, a cathode and a matrix layer interposed therebetween, said matrix layer supporting an electrolyte, the reactive fuel and air producing reacted gases upon communication with said fuel cell elements:
   at least two substantially rectangular plate members spaced essentially in parallel and having said at least one fuel cell element positioned between and in contact with each of said at least two plate members, allowing said at least one fuel cell element to contact adjacent ones of said at least two plate members, said contacting surfaces of each of said adjacent ones of said at least two plate members having four edges;
   groove means extending along a first one of said contacting surfaces of said at least two plate members for supplying the reactive fuel to said cell elements, said groove means having a first entry manifold to deliver the reactive fuel to said groove means and a first exit manifold to receive reacted gases, wherein said first entry and exit manifolds are aligned along the same edges of said first one of said contacting surfaces;

channel means extending along a remaining one of said contact surfaces of said at least two plate members for supplying reactive air to said fuel elements, said channel means having a second entry manifold to deliver the reactive air to said channel means and a second exit manifold to receive reacted gases, wherein said second entry and exit manifolds are aligned along the same edge of said second one of said contacting surfaces; and tunnel passages extending within and across the length of each of said at least two plate members, wherein said tunnel passages transfer cooling gases within each of said at least two plate members, wherein said tunnel passages extend substantially perpendicular to said groove means and said channel means, and wherein each of said at least two plate members have two sections defined by a plane extending through said tunnel passages.

6. The fuel cell element as defined as in claim 5, wherein said first entry and exit manifolds and said second entry and exit manifolds are positioned on similar sides of said at least two plate members.

7. The fuel cell element as defined in claim 5, wherein said first entry and exit manifolds and said second entry and exit manifolds are positioned on opposite sides of said at least two plate members.

8. The fuel cell element as defined in claim 5, wherein said cooling gases comprise air.

* * * * *